US010795201B2

(12) United States Patent
Nakamura et al.

(10) Patent No.: US 10,795,201 B2
(45) Date of Patent: Oct. 6, 2020

(54) DISPLAY DEVICE

(71) Applicant: Sharp Kabushiki Kaisha, Sakai, Osaka (JP)

(72) Inventors: Jin Nakamura, Sakai (JP); Naoki Moriya, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/292,384

(22) Filed: Mar. 5, 2019

(65) Prior Publication Data

US 2019/0278132 A1   Sep. 12, 2019

(30) Foreign Application Priority Data

Mar. 8, 2018   (JP) .................. 2018-041939

(51) Int. Cl.
G02F 1/1335   (2006.01)
G02B 5/30   (2006.01)
G02F 1/139   (2006.01)
G02F 1/133   (2006.01)

(52) U.S. Cl.
CPC ..... *G02F 1/133528* (2013.01); *G02B 5/3075* (2013.01); *G02F 1/139* (2013.01); *G02F 1/13318* (2013.01); *G02F 1/133502* (2013.01); *G02F 2202/28* (2013.01)

(58) Field of Classification Search
None
See application file for complete search history.

(56) References Cited

U.S. PATENT DOCUMENTS

| 6,246,459 | B1 * | 6/2001 | Simhambhatla .. G02F 1/133308 349/149 |
| 2008/0117497 | A1 | 5/2008 | Shimodaira |
| 2008/0225216 | A1 | 9/2008 | Shimodaira |
| 2012/0243091 | A1 * | 9/2012 | Amm ..................... G06F 1/1605 359/489.07 |
| 2017/0187934 | A1 * | 6/2017 | Kwak ................... H04N 5/2251 |
| 2020/0117034 | A1 * | 4/2020 | Yin ........................ G06F 1/1643 |

FOREIGN PATENT DOCUMENTS

| JP | 2008-257191 A | 10/2008 |
| JP | 4886462 B2 | 2/2012 |

* cited by examiner

*Primary Examiner* — Richard H Kim
(74) *Attorney, Agent, or Firm* — Keating & Bennett, LLP

(57) ABSTRACT

It is possible to cause a display device to achieve an increased light transmittance for light to reach an imaging element. A display device having a see-through panel structure includes: a display panel; a protection plate provided on a front side of the display panel; an imaging element provided on a back side of the display panel; a second polarizer provided between the display panel and the protection plate; and a transparent material with which a hole passing through the second polarizer is filled.

1 Claim, 12 Drawing Sheets

FIG. 5
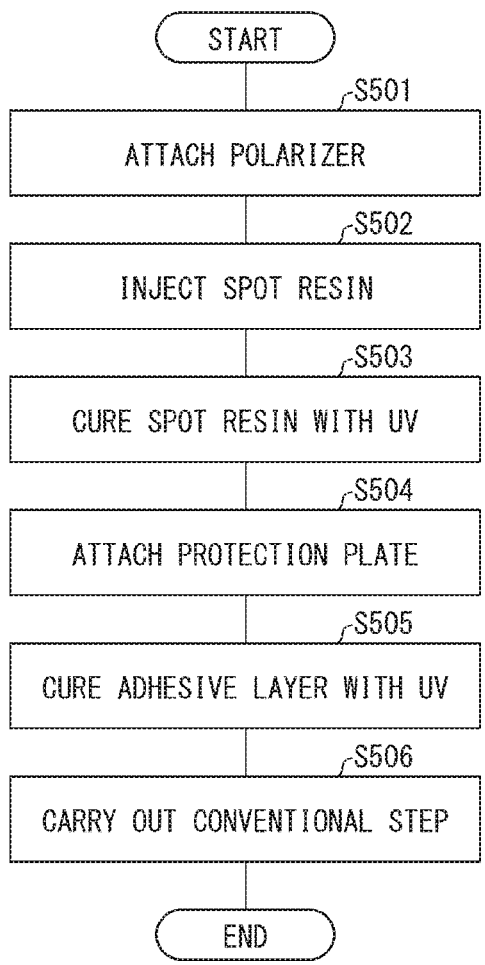
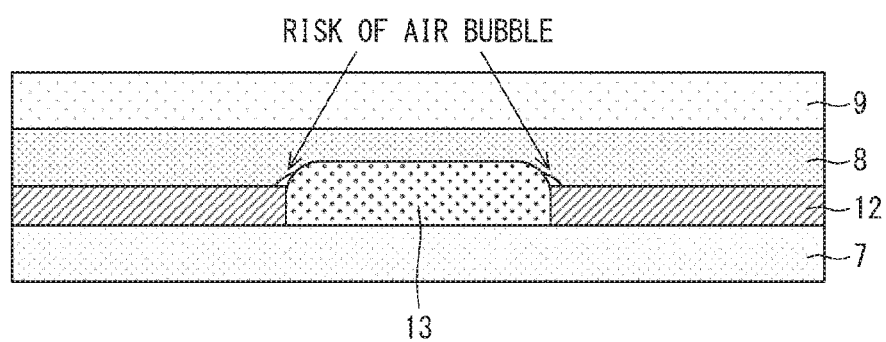

FIG. 6
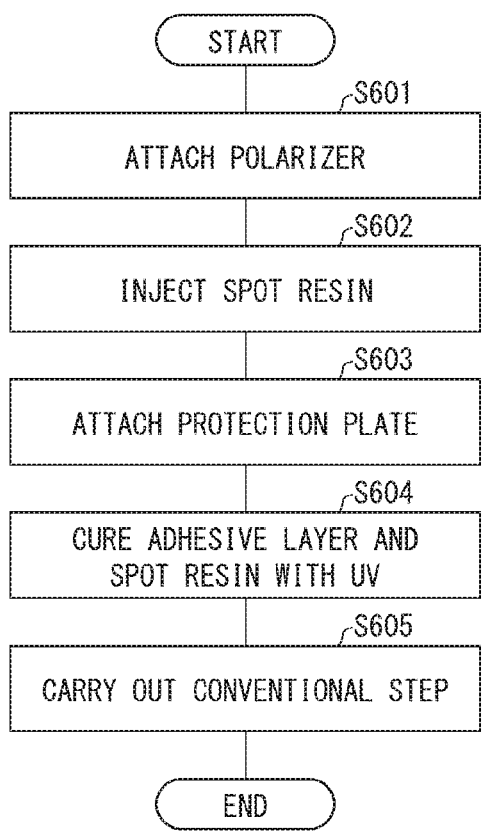
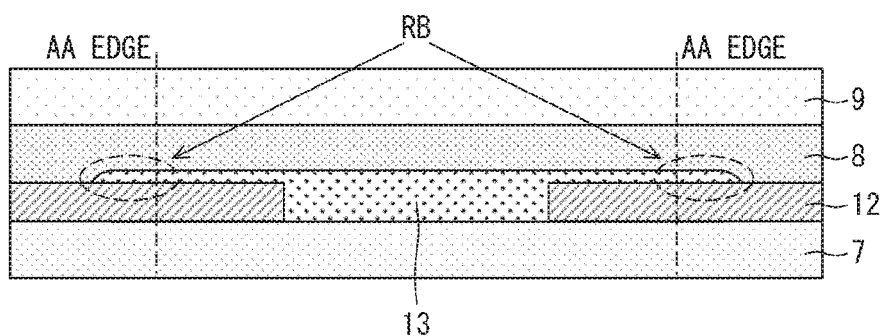

DISPLAY DEVICE

This Nonprovisional application claims priority under 35 U.S.C. § 119 on Patent Application No. 2018-041939 filed in Japan on Mar. 8, 2018, the entire contents of which are hereby incorporated by reference.

Technical Field

The present invention relates to a display device.

Background Art

Some display devices, such as liquid crystal display devices, include a light transmitting part (see-through part) in a display region. Some display devices include a see-through region which takes a form other than a hole (for example, a form of a cutout). In a case where such a display device is configured such that a space in a hole passing through a polarizer is filled with an air layer, the air layer adversely affects characteristics of an imaging element (camera) provided under a see-through region.

CITATION LIST

Patent Literature

[Patent Literature 1] Japanese Patent No. 4886462
[Patent Literature 2] Japanese Patent Application Publication, Tokukai, No. 2008-257191

SUMMARY OF INVENTION

Technical Problem

According to the foregoing display device, the air layer causes an increase in light reflectance, and ultimately causes a decrease in light transmittance (see FIG. 13). It follows that a decreased amount of light is taken into the imaging element and, accordingly, sufficient resolution is not obtained.

An object of an aspect of the present invention is to allow a display device, having a see-through panel structure, to achieve an increased light transmittance for light to reach an imaging element.

Solution to Problem

In order to attain the above object, a display device in accordance with an aspect of the present invention is a display device having a see-through panel structure, including: a display panel; a protection plate provided on a front side of the display panel; an imaging element provided on a back side of the display panel; a polarizer provided between the display panel and the protection plate; and a transparent material with which a hole passing through the polarizer is filled.

Furthermore, in order to attain the above object, a display device in accordance with an aspect of the present invention is a display device having a see-through panel structure, including: a display panel; a protection plate provided on a front side of the display panel; an imaging element provided on a back side of the display panel; a polarizer provided between the display panel and the protection plate; and a transparent material with which a cutout formed in the polarizer is filled.

Advantageous Effects of Invention

According to an aspect of the present invention, it is possible to cause a display device to achieve an increased light transmittance for light to reach an imaging element.

BRIEF DESCRIPTION OF DRAWINGS

FIG. 5 is a view illustrating a first process, in accordance with Embodiment 3 of the present invention, of attaching a protection plate to a second polarizer after a liquid transparent resin is cured.

FIG. 6 is a view illustrating a second process, in accordance with Embodiment 3 of the present invention, of attaching the protection plate to the second polarizer in a state where the liquid transparent resin is not cured.

DESCRIPTION OF EMBODIMENTS

The following description will discuss embodiments of the present invention with reference to FIGS. 1 through 12. Note, however, that those embodiments are only illustrative.

Embodiment 1

The following description will discuss Embodiment 1 of the present invention.

Figure 1:
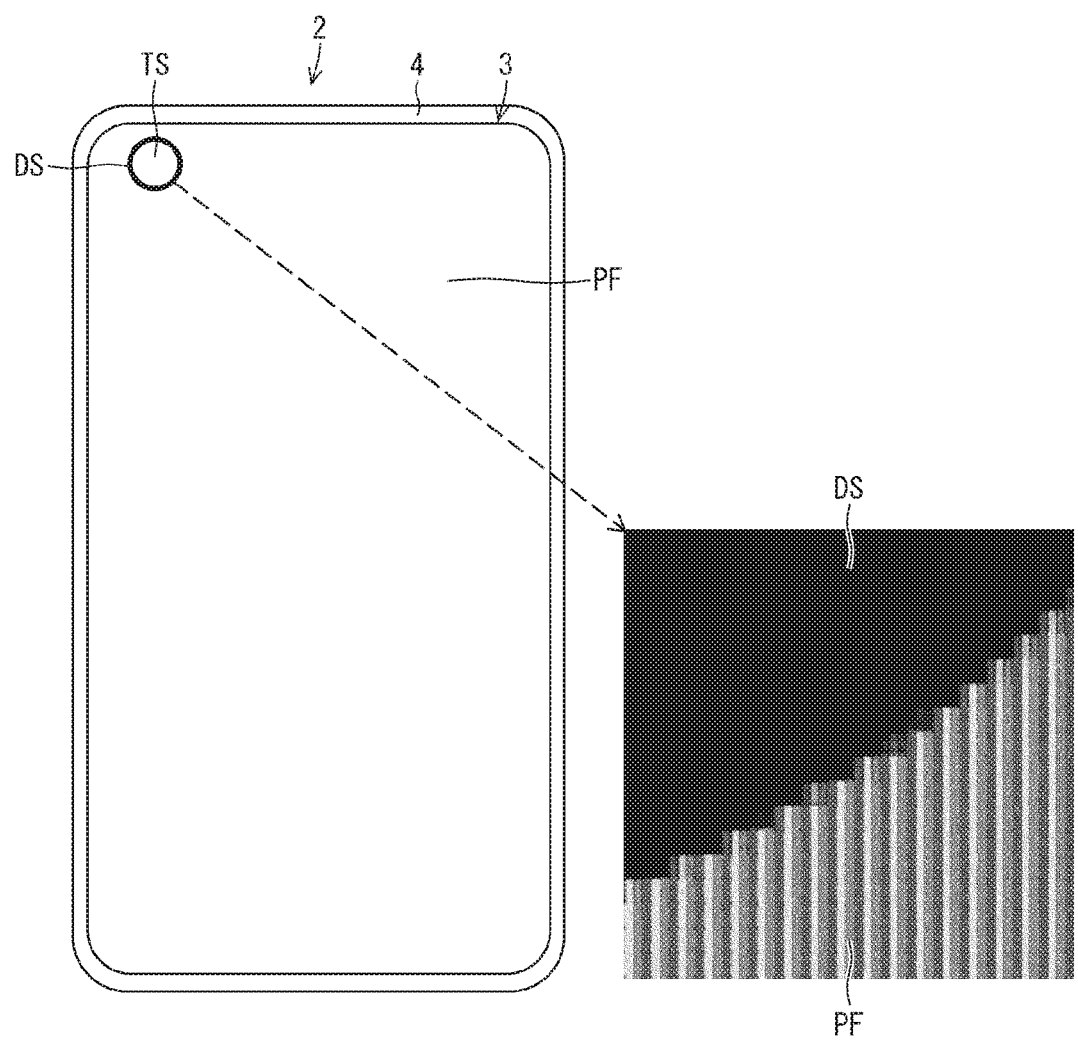
FIG. 1 is a plan view illustrating a configuration of a display device in accordance with Embodiment 1 of the present invention.
Figure 2:
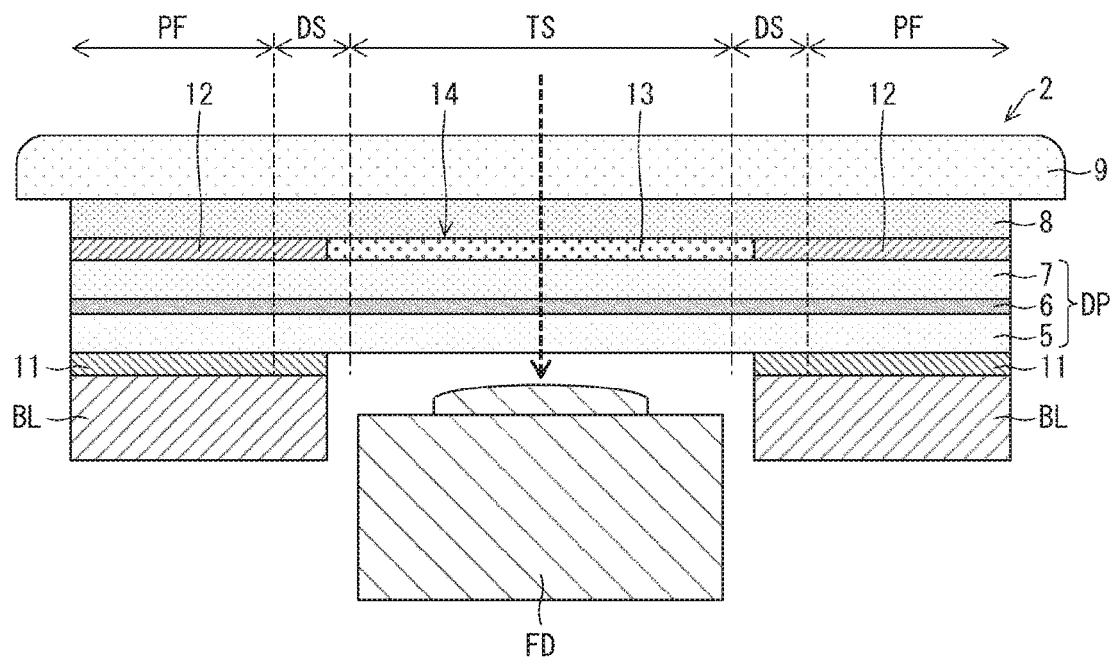
FIG. 2 is a cross-sectional view illustrating the configuration of the display device in accordance with Embodiment 1 of the present invention.

FIG. 1 is a plan view illustrating a configuration of a display device 2 in accordance with Embodiment 1 of the present invention. FIG. 2 is a cross-sectional view illustrating the configuration of the display device 2 in accordance with Embodiment 1 of the present invention.

(Display Device 2)

As illustrated in FIGS. 1 and 2, the display device 2 (for example, smartphone) in accordance with Embodiment 1 has a see-through panel structure. The see-through panel structure indicates the following structure. That is, the display device 2 includes a display panel DP including a first substrate 5, and the display panel DP has a light transmitting part TS (see-through hole part) which has such a layer structure that, unlike a typical liquid crystal display region, although a liquid crystal layer is provided, materials which block transmission of light (a metal wire, an ITO wire, an insulating film, BM, a color material, and the like) are reduced depending on a use application of the display device 2. The light transmitting part TS having such a layer structure allows a transmittance to be maximized. The light transmitting part TS includes part of a region of the first substrate 5.

The display device 2 in accordance with Embodiment 1 is a display device having a see-through panel structure, including: the display panel DP; a protection plate 9 provided on a front side of the display panel DP; an imaging element FD provided on a back side of the display panel DP; a second polarizer 12 provided between the display panel DP and the protection plate 9; and a liquid transparent resin (transparent material) 13 with which a hole 14 passing through the second polarizer 12 is filled. The display device 2 will be described below in detail.

The display device 2 includes: a backlight unit BL; the imaging element FD (including a lens); the display panel DP (liquid crystal panel); a first polarizer 11 and the second polarizer 12 between which the display panel DP is provided; and the protection plate 9 (cover glass) which is bonded to the second polarizer 12 via an adhesive layer 8 having a light-transmitting property. The imaging element FD is provided on the back side of the display panel DP. The adhesive layer 8 is, for example, an OCA (Optical Clear Adhesive) which is a sheet-shaped adhesive tape that does not include a base material.

The display panel DP includes the first substrate 5 (active matrix substrate), a liquid crystal layer 6, and a second substrate 7 (counter substrate, color filter substrate) including primary color filters. The display device 2 is configured such that the backlight unit BL, the first polarizer 11, the first substrate 5, the liquid crystal layer 6, the second substrate 7, the second polarizer 12, the adhesive layer 8, and the protection plate 9 are disposed in this order in an upward direction (in a direction in which display light exits).

As illustrated in FIG. 1, the display panel DP has: the light transmitting part TS (for example, a see-through camera hole) from which no display light exits; and a light blocking part DS which surrounds the light transmitting part TS. The light transmitting part TS is provided inside an edge of a display area 3. The light blocking part DS is surrounded by an image forming part PF. The display light is light which is generated in pixels (not illustrated) and corresponds to image data. The light transmitting part TS does not include a pixel. The light transmitting part TS has a planar surface whose shape is determined by, for example, characteristics of the imaging element FD. It is desirable that the shape of the planar surface is designed in consideration of lens characteristics, such as a shape of the lens, and an angle at which light enters the lens.

(Liquid Transparent Resin 13)

According to the display device 2 having the light transmitting part TS, the liquid transparent resin 13 fills the hole 14 which is formed in the second polarizer 12 so that the light transmitting part TS is formed. The liquid transparent resin 13 is, for example, an OCR (Optical Clear Resin) or a precure OCR, each of which is a liquid UV (UltraViolet) curable resin. Note that, in FIG. 2, the adhesive layer 8 and the liquid transparent resin 13 are adjacent to each other. Alternatively, the adhesive layer 8 and the liquid transparent resin 13 can be integrated with each other.

Comparison Between Conventional Technique and Embodiment 1

Figure 13:
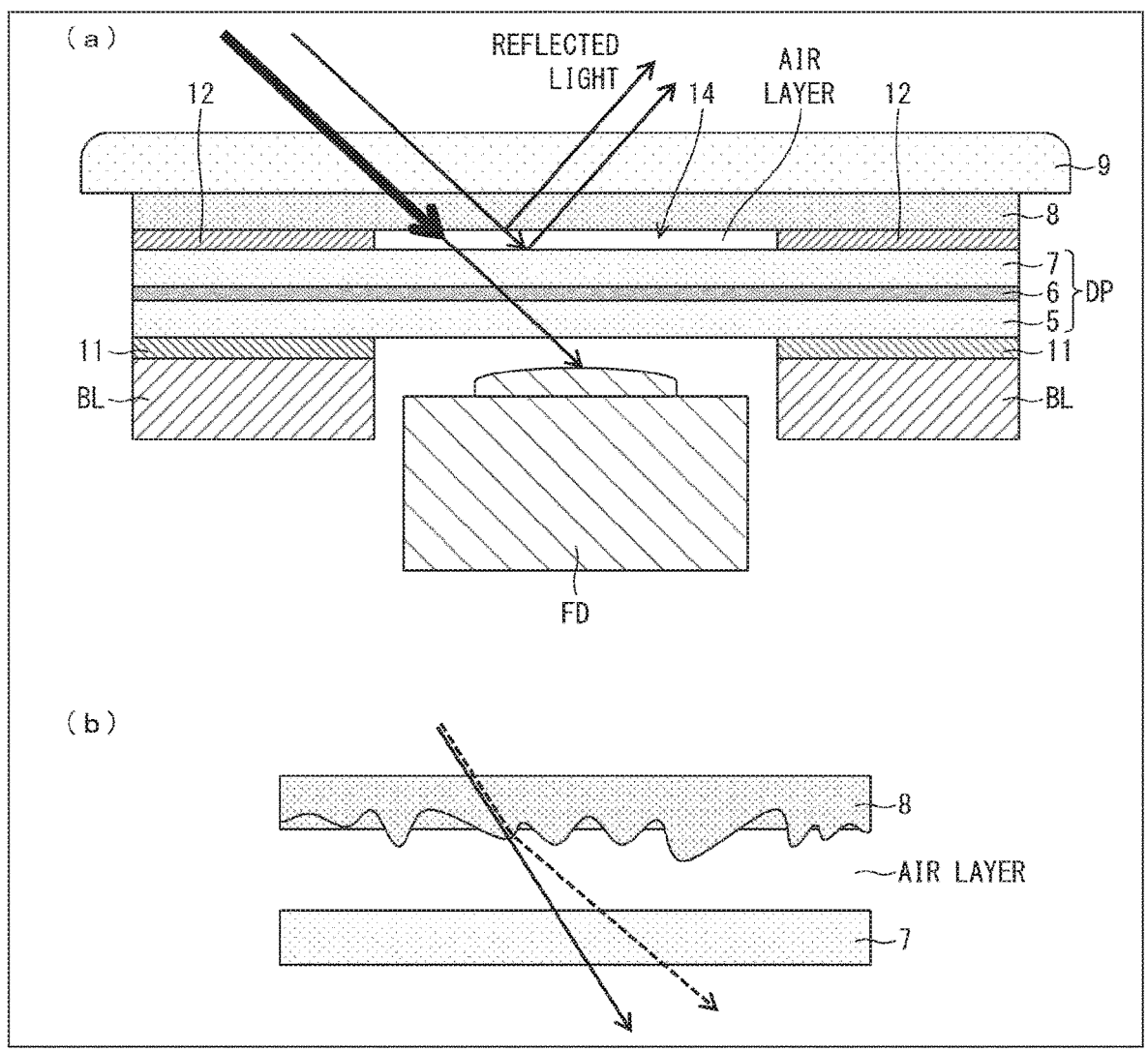
FIG. 13 is a view illustrating a configuration of a display device in accordance with a conventional technique.

A light transmittance considerably varies depending on whether or not an air layer is present in the hole 14 formed in the second polarizer 12. In a case where an air layer is present in the hole 14 as in the conventional technique illustrated in FIG. 13, a reflectance of the air layer is increased because, while a refractive index of the air layer is 1 (one), a refractive index of each of a resin and glass in the vicinity of the air layer is approximately 1.5. This ultimately causes a decrease in transmittance.

In contrast, according to Embodiment 1 illustrated in FIG. 2, the hole 14 is filled with the liquid transparent resin 13. This allows a refractive index of the liquid transparent resin 13 and a refractive index in the vicinity thereof to be uniform. It is therefore possible to suppress loss of the transmittance as much as possible, and possible to maximize the transmittance.

A camera provided to a conventional smartphone or the like is disposed under one sheet of glass. In a case where the conventional smartphone or the like is arranged so as to (i) have a see-through structure and (ii) include an air layer, then the camera captures an image through two sheets of glass. Therefore, loss of a transmittance is assumed.

In contrast, according to Embodiment 1 illustrated in FIG. 2, the hole 14 is filled with the liquid transparent resin 13. This allows the refractive index of the liquid transparent resin 13 and the refractive index in the vicinity thereof to be uniform. It is therefore possible to achieve an effect identical to that of a configuration in which a camera captures an image through one sheet of glass.

Besides, in a case where (i) an air layer is present in the hole 14 formed in the second polarizer 12 and (ii) a surface of the adhesive layer 8 which surface is in contact with the air layer is uneven, a direction in which light travels may be changed due to refraction. In a case where the imaging element FD is disposed right under the light transmitting part TS, interference of refracted light occurs and, accordingly, a distortion of an image is caused, so that a desired effect cannot be brought about.

Effect of Embodiment 1

Figure 3:
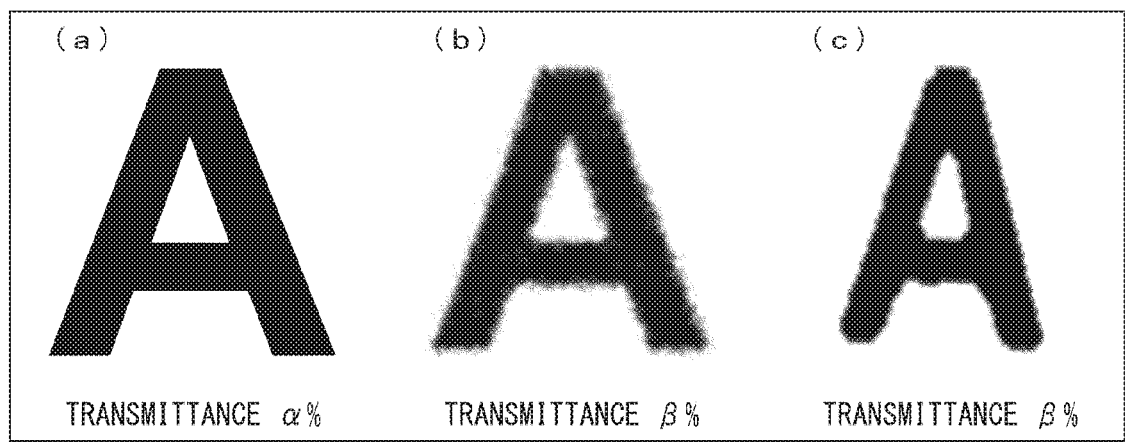
FIG. 3 is a view illustrating an effect of the display device in accordance with Embodiment 1 of the present invention.

FIG. 3 is a view illustrating an effect of the display device 2 in accordance with Embodiment 1. (a) of FIG. 3 illustrates an example of a clear and accurate image in accordance with Embodiment 1. (b) of FIG. 3 illustrates an example of an image, which is unclear due to an effect of a transmittance, in accordance with the conventional technique. (c) of FIG. 3 illustrates an example of an image, which is inaccurate due to an effect of a refractive index, in accordance with the conventional technique.

(1) Maximization of Transmittance

In the conventional technique, a decrease in transmittance means a decrease in amount of information on an image. This ultimately allows obtainment of only an unclear image as illustrated in (b) of FIG. 3. In this case, a transmittance $\alpha$ in Embodiment 1 of the present invention and a transmittance $\beta$ in the conventional technique have the following relationship: $\alpha > \beta$.

In contrast, since Embodiment 1 allows the transmittance to be maximized, it is possible to capture a clear image as illustrated in (a) of FIG. 3.

(2) Elimination of Distortion of Image

In the conventional technique, in a case where (i) an air layer is present in the hole 14 formed in the second polarizer 12 and (ii) the surface of the adhesive layer 8 which surface is in contact with the air layer is uneven, the direction in which light travels becomes ununiform, so that a distortion of an image as illustrated in (c) of FIG. 3 may occur.

In contrast, since Embodiment 1 allows the refractive index of the liquid transparent resin 13 and the refractive index in the vicinity thereof to be uniform, it is possible to capture an accurate image having no distortion as illustrated in (a) of FIG. 3.

Embodiment 2

The following description will discuss Embodiment 2 of the present invention. Note that, for convenience, an identical reference numeral will be given to a member having a function identical to that of a member described in Embodiment 1, and description of the member will be omitted. Note also that Embodiment 2 can be applied to Embodiment 1.

Figure 4:
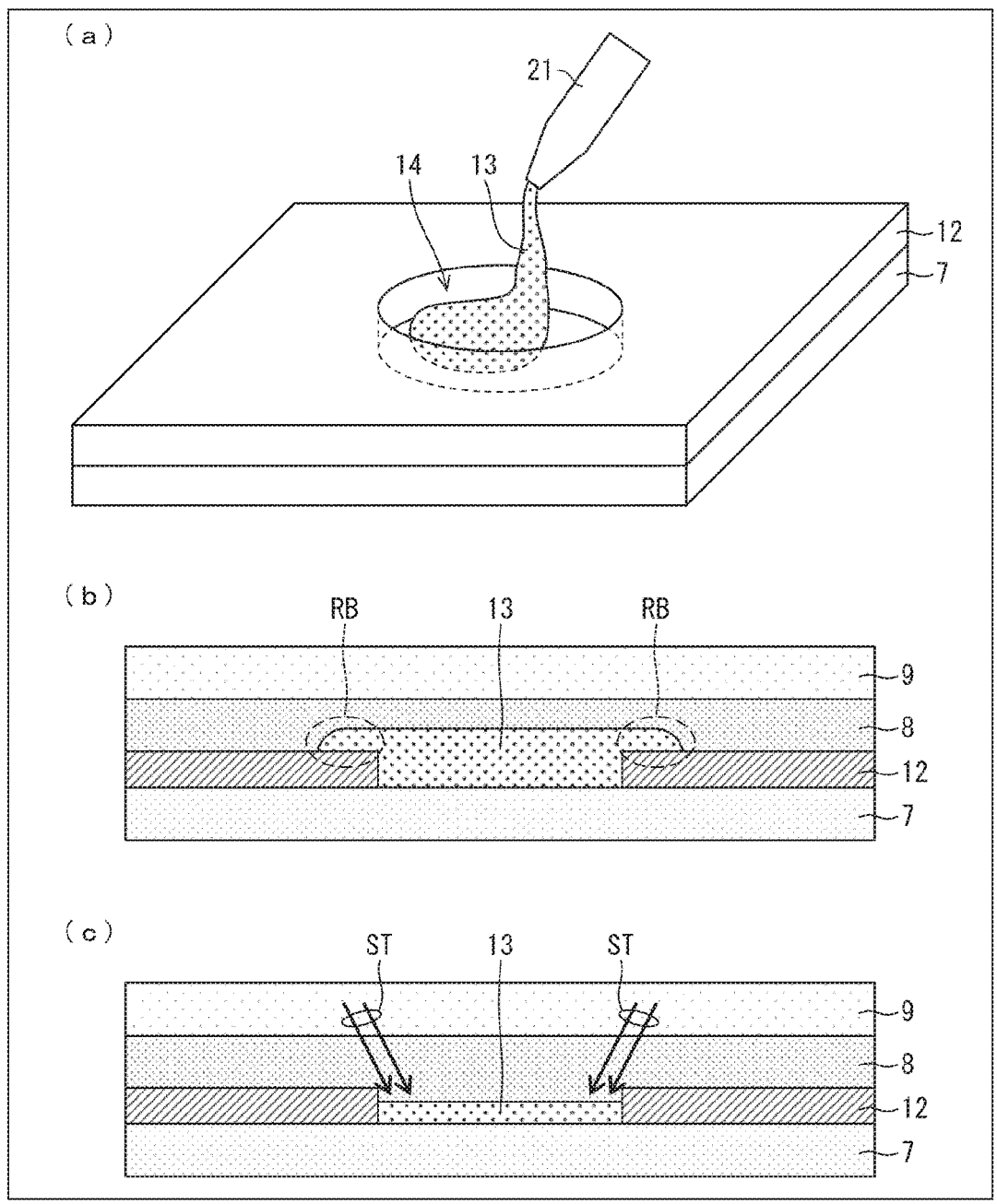
FIG. 4 is a view concerning injection of a liquid transparent resin in accordance with Embodiment 2 of the present invention.

FIG. 4 is a view concerning injection of a liquid transparent resin 13 in accordance with Embodiment 2. (a) of FIG. 4 illustrates a state where the liquid transparent resin 13 is injected into a hole 14 formed in a second polarizer 12. (b) of FIG. 4 illustrates a case where a larger amount of the liquid transparent resin 13 is injected into the hole 14. (c) of FIG. 4 illustrates a case where a smaller amount of the liquid transparent resin 13 is injected into the hole 14.

As illustrated in (a) of FIG. 4, a display device 2 in accordance with Embodiment 2 is configured such that (i) the hole 14 is formed in part of the second polarizer 12 which part corresponds to a light transmitting part TS and (ii) the liquid transparent resin 13 is injected into the hole 14.

The hole 14 is a very narrow space surrounded by the second polarizer 12 having a thickness of approximately not more than 100 µm. Therefore, in a case where (i) the liquid transparent resin 13 is not precisely injected into the hole 14 and a larger amount of the liquid transparent resin 13 is injected into the hole 14 and (ii) then a protection plate 9 is attached to the second polarizer 12, the liquid transparent resin 13 may protrude from the hole 14. As a result of protrusion of the liquid transparent resin 13, a resin boundary part RB may be visually recognized from the outside as illustrated in (b) of FIG. 4.

On the other hand, in a case where a smaller amount of the liquid transparent resin 13 is injected into the hole 14 and the protection plate 9 is attached to the second polarizer 12, a difference in thickness between the liquid transparent resin 13 and the second polarizer 12 is forcibly absorbed. In so doing, stress ST is applied to a second substrate 7, the second polarizer 12, and an adhesive layer 8 as illustrated in (c) of FIG. 4, so that a problem, such as unevenness or breakage of the display panel DP or generation of an air bubble, arises.

Therefore, a predetermined amount of the liquid transparent resin 13 must be injected into the hole 14 with high precision. In view of the above, it is necessary to carry out injection of the liquid transparent resin 13 with use of a predetermined amount of liquid discharging device 21 (dispenser) as illustrated in (a) of FIG. 4. The injection is carried out with use of, for example, a typical air type predetermined amount of liquid discharging device 21 or a "jet type" or "piston type" predetermined amount of liquid discharging device 21 which is specialized in high-precision injection. The jet type predetermined amount of liquid discharging device 21 discharges a resin with high precision by high-speed reciprocating motions of a rod, irrespective of a mechanical type or a piezoelectric type. The piston type predetermined amount of liquid discharging device 21 discharges a predetermined amount of a resin in such a manner that the predetermined amount of the resin is pushed out by rotation of a rotor section. The jet type predetermined amount of liquid discharging device 21 and the piston type predetermined amount of liquid discharging device 21 are both suitable to inject a predetermined amount of the liquid transparent resin 13 into the hole 14 with high precision, because they both allow the injection with a repeatability of not more than 1%.

Embodiment 3

The following description will discuss Embodiment 3 of the present invention. Note that, for convenience, an identical reference numeral will be given to a member having a function identical to that of a member described in Embodiment 1, and description of the member will be omitted. Note also that Embodiment 3 can be applied to Embodiments 1 and 2.

A module mounting process in accordance with Embodiment 3 roughly includes two patterns. That is, the module mounting process includes: attaching a protection plate 9 to a second polarizer 12 after a liquid transparent resin 13 is cured (first process); and attaching the protection plate 9 to the second polarizer 12 in a state where the liquid transparent resin 13 is not cured (second process).

(Procedure of First Process)

FIG. 5 is a view illustrating the first process, in accordance with Embodiment 3, of attaching the protection plate 9 to the second polarizer 12 after the liquid transparent resin 13 is cured. (a) of FIG. 5 illustrates a flowchart. (b) of FIG. 5 illustrates a risk of an air bubble.

The first process of attaching the protection plate 9 to the second polarizer 12 after the liquid transparent resin 13 is cured will be described below with reference to (a) of FIG. 5. According to the a display device 2 in accordance with Embodiment 3, the protection plate 9 is attached to the second polarizer 12 after the liquid transparent resin 13 injected into a hole 14 is cured.

(Step S501)

The second polarizer 12 is attached to a display panel DP.

(Step S502)

A liquid transparent filling resin 13 (filling resin) is injected into the hole 14 formed in the second polarizer 12.

(Step S503)

The liquid transparent filling resin 13 is cured with use of UV.

(Step S504)

The protection plate 9 is attached to the second polarizer 12 and the liquid transparent resin 13 via an adhesive layer 8.

(Step S505)

The adhesive layer 8 is cured with use of UV.

(Step S506)

A conventional step is carried out.

(Effect of First Process)

According to the first process, the liquid transparent resin 13 is cured after the liquid transparent filling resin 13 is injected into the hole 14 and before the protection plate 9 is attached to the second polarizer 12 and the liquid transparent resin 13. This brings about an effect that (i) the liquid transparent resin 13, with which the hole 14 formed in the second polarizer 12 is filled, does not spread after the protection plate 9 is attached to the second polarizer 12 and the liquid transparent resin 13 and (ii) the liquid transparent resin 13 remains in the hole 14 as viewed from the front. According to the effect, it is possible to avoid a risk that the liquid transparent resin 13 protrudes from the hole 14 to an active area and, accordingly, a resin boundary part RB (see (b) of FIG. 6) is visually recognized from the outside.

Note, however, that there is a disadvantage that, in a case where the liquid transparent resin 13 is injected, in a larger amount than expected, into the hole 14, the adhesive layer 8 cannot follow a difference in thickness between the liquid transparent resin 13 and the second polarizer 12 and, accordingly, an air bubble may be generated (see (b) of FIG. 5).

(Description of Second Process)

FIG. 6 is a view illustrating the second process, in accordance with Embodiment 3, of attaching the protection plate 9 to the second polarizer 12 in a state where the liquid transparent resin 13 is not cured. (a) of FIG. 6 illustrates a flowchart. (b) of FIG. 6 illustrates the resin boundary part RB.

The second process of attaching the protection plate 9 to the second polarizer 12 in a state where the liquid transparent resin 13 is not cured will be described below with reference to (a) of FIG. 6. According to the display device 2 in accordance with Embodiment 3, the protection plate 9 is attached to the second polarizer 12 before the liquid transparent resin 13 injected into the hole 14 is cured.

(Step S601)

The second polarizer 12 is attached to the display panel DP.

(Step S602)

The liquid transparent filling resin 13 is injected into the hole 14 formed in the second polarizer 12.

(Step S603)

The protection plate 9 is attached to the second polarizer 12 and the liquid transparent resin 13 via the adhesive layer 8.

(Step S604)

The adhesive layer 8 and the liquid transparent filling resin 13 are cured with use of UV.

(Step S605)

The conventional step is carried out.

(Effect of Second Process)

According to the second process, the protection plate 9 is attached to the second polarizer 12 and the liquid transparent resin 13 in a state where the liquid transparent filling resin 13 is not cured. This reduces the risk which the first process carries, that is, the risk of an air bubble caused by the difference in thickness between the liquid transparent filling resin 13 and the second polarizer 12. A raised liquid transparent resin 13 is pressed by attachment of the protection plate 9, so that the raised liquid transparent resin 13 becomes substantially flat.

Note, however, that, in a case where the liquid transparent resin 13 which is pressed down and is spread by the protection plate 9 goes beyond a boundary (AA edge) of the active area, an edge of the resin boundary part RB may be visually recognized from the outside (see (b) of FIG. 6). A configuration for dealing with this risk will be later described in Embodiment 7.

Effect of Embodiment 3

As has been described, the first process and the second process have respective different features, and bring about respective different effects. Therefore, it is possible to employ either the first process or the second process, depending on circumstances.

For example, in a case where the liquid transparent resin 13 is injected into a cutout or the like, the liquid transparent resin 13 may flow out. Therefore, in this case, the first process is suitable in which, after a flow of the liquid transparent resin 13 is stopped by curing the liquid transparent resin 13 immediately after the liquid transparent resin 13 is injected into the cutout or the like, the protection plate 9 is attached to the second polarizer 12 and the liquid transparent resin 13.

On the other hand, in a case where the liquid transparent resin 13 is injected into a hole, employment of the second process allows omission of a curing process, which omission leads to a decrease in man-hour, and further allows elimination of the risk of an air bubble, as compared with the first process. Note, however, that in a case where the second process is employed, a refractive index of the liquid transparent resin 13 needs to match a refractive index of the adhesive layer 8. In other words, in a case where (i) the refractive index of the liquid transparent resin 13 does not match the refractive index of the adhesive layer 8 and (ii) the liquid transparent resin 13 protrudes to the active area, the edge of the resin boundary part RB may be visually recognized from the outside. Therefore, care needs to be taken.

Embodiment 4

The following description will discuss Embodiment 4 of the present invention. Note that, for convenience, an identical reference numeral will be given to a member having a function identical to that of a member described in Embodiment 1, and description of the member will be omitted. Note also that Embodiment 4 can be applied to Embodiments 2 and 3.

According to a display device 2 in accordance with Embodiment 4, after a liquid transparent resin 13 is injected into a hole 14 formed in a second polarizer 12, part of the liquid transparent resin 13 which part exceeds a height of the second polarizer 12 is scraped.

Figure 7:
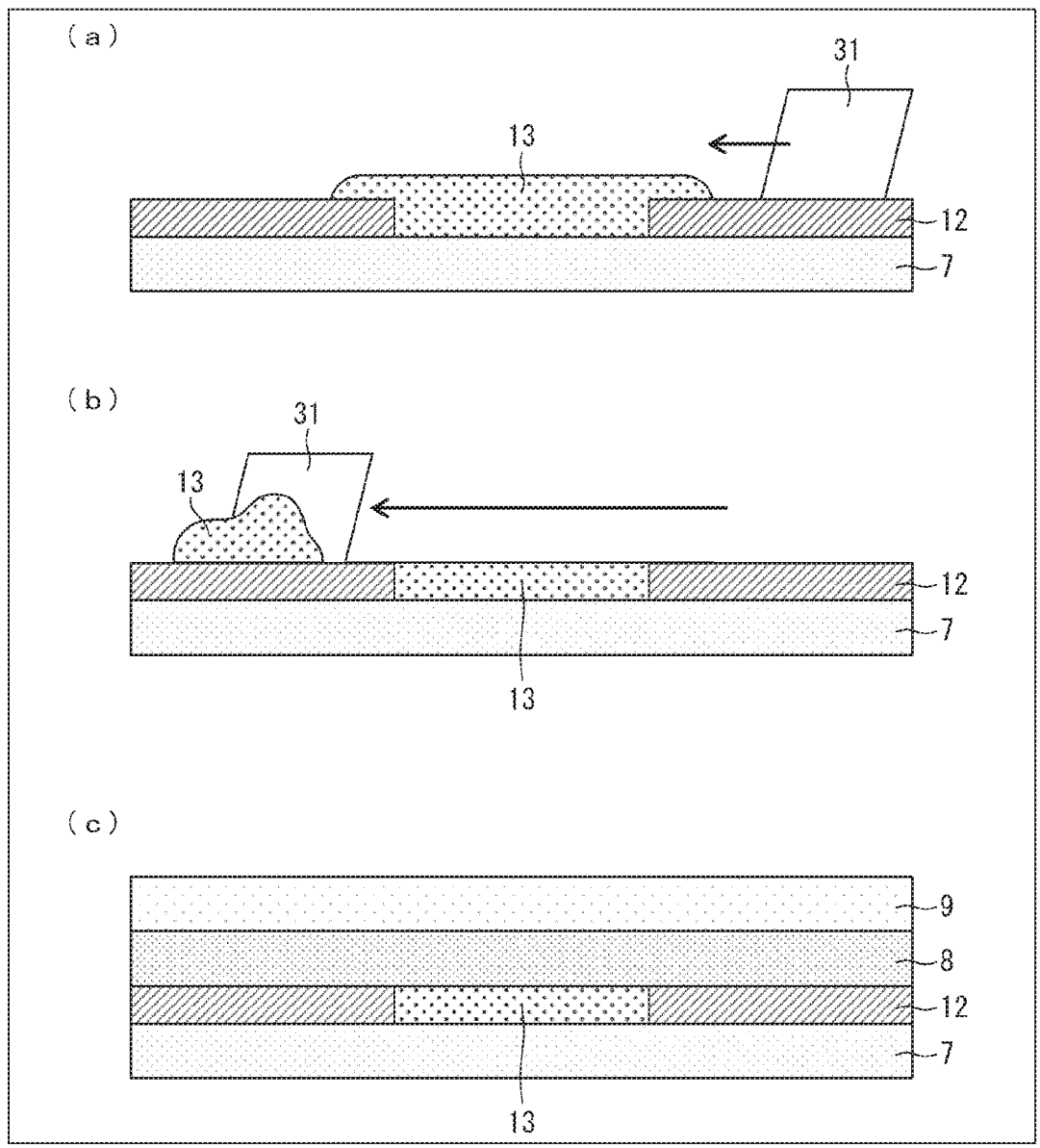
FIG. 7 is a view illustrating a state where an extra part of a liquid transparent resin in accordance with Embodiment 4 of the present invention is scraped.

FIG. 7 is a view illustrating a state where an extra part of the liquid transparent resin 13 in accordance with Embodiment 4 is scraped. As illustrated in (a) of FIG. 7, there is a case where a predetermined amount of the liquid transparent resin 13 is not injected into the hole 14. Even in this case, it is possible to cause a height of the liquid transparent resin 13 to be substantially identical to a height of a second polarizer 12 by (i) sliding a scraper 31 in such a manner as to cut a surface of the second polarizer 12 and (ii) thereby removing the extra part of the liquid transparent resin 13 (see (b) of FIG. 7).

In a case where the liquid transparent resin 13 is made completely flat by Embodiment 4, protrusion of the liquid transparent resin 13 is minimally suppressed even with employment of a second process of attaching a protection plate 9 to the second polarizer 12 in a state where the liquid transparent resin 13 is not cured. Furthermore, the second process is facilitated. Therefore, it is possible to decrease a man-hour.

Embodiment 5

The following description will discuss Embodiment 5 of the present invention. Note that, for convenience, an identical reference numeral will be given to a member having a function identical to that of a member described in Embodiment 1, and description of the member will be omitted. Note also that Embodiment 5 can be applied to Embodiment 1.

According to a display device 2 in accordance with Embodiment 5, a liquid transparent resin 13 is a liquid transparent resin which is spread by attaching a protection plate 9 to a second polarizer 12 after the liquid transparent resin is applied to a surface of the second polarizer 12.

Figure 8:
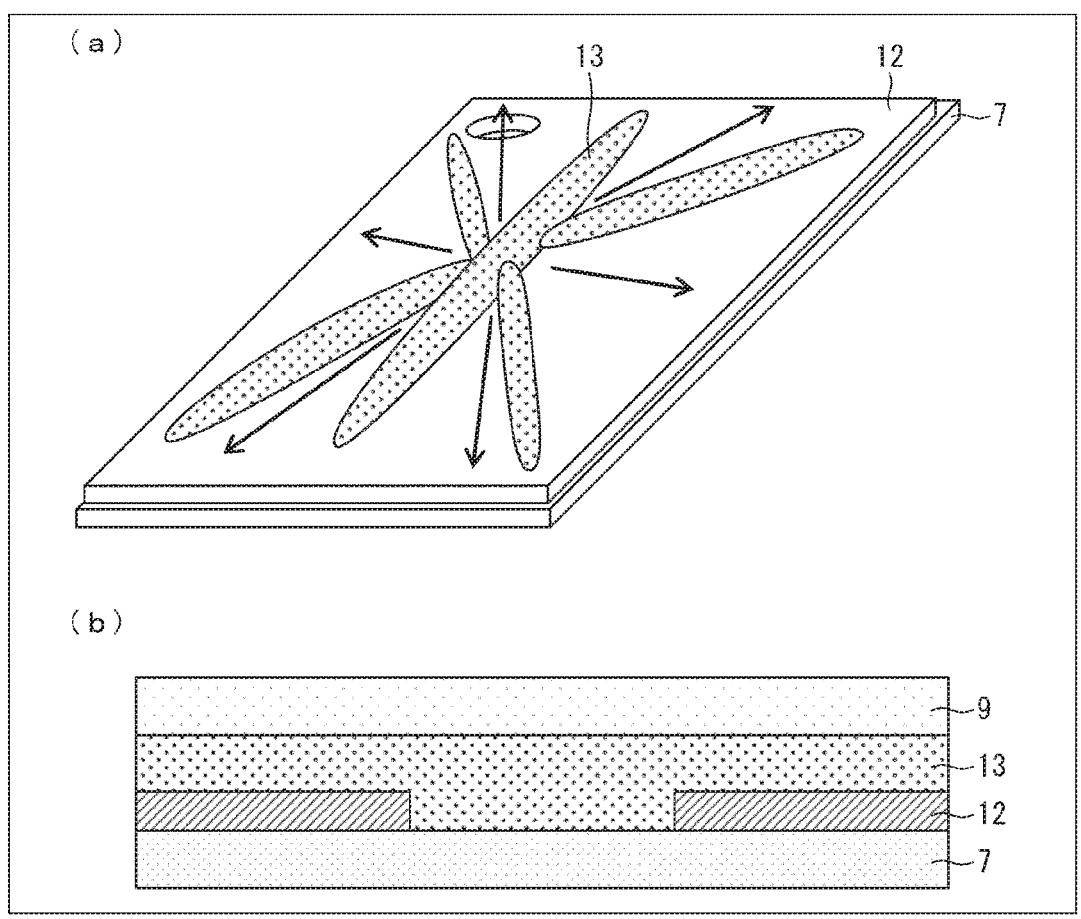
FIG. 8 is a view illustrating a state where a hole formed in a second polarizer is filled with a liquid transparent resin, in accordance with Embodiment 5 of the present invention, to which a protection plate is to be attached.

FIG. 8 is a view illustrating a state where a hole 14 formed in the second polarizer 12 is filled with the liquid transparent resin 13, in accordance with Embodiment 5, to which the protection plate 9 is to be attached. As illustrated in FIG. 8, an appropriate liquid transparent resin 13 is applied to the surface of the second polarizer 12. Then, the protection plate 9 is attached to the second polarizer 12. This causes the liquid transparent resin 13 to be spread, and ultimately causes the hole 14 formed in the second polarizer 12 to be filled with the liquid transparent resin 13.

According to Embodiment 5, the liquid transparent resin 13 is provided between the protection plate 9 and the second polarizer 12. Therefore, according to Embodiment 5, since no adhesive layer 8 is provided, it is possible to avoid a risk which a filling resin carries, that is, a risk that a resin boundary part RB is visually recognized due to a difference in refractive index between an adhesive layer 8 and the liquid transparent resin 13.

Embodiment 6

The following description will discuss Embodiment 6 of the present invention. Note that, for convenience, an identical reference numeral will be given to a member having a function identical to that of a member described in Embodiment 1, and description of the member will be omitted. Note also that Embodiment 6 can be applied to Embodiments 1 through 5.

According to a display device 2 in accordance with Embodiment 6, a liquid transparent resin 13 is a low-elastic UV curable resin.

Figure 9:
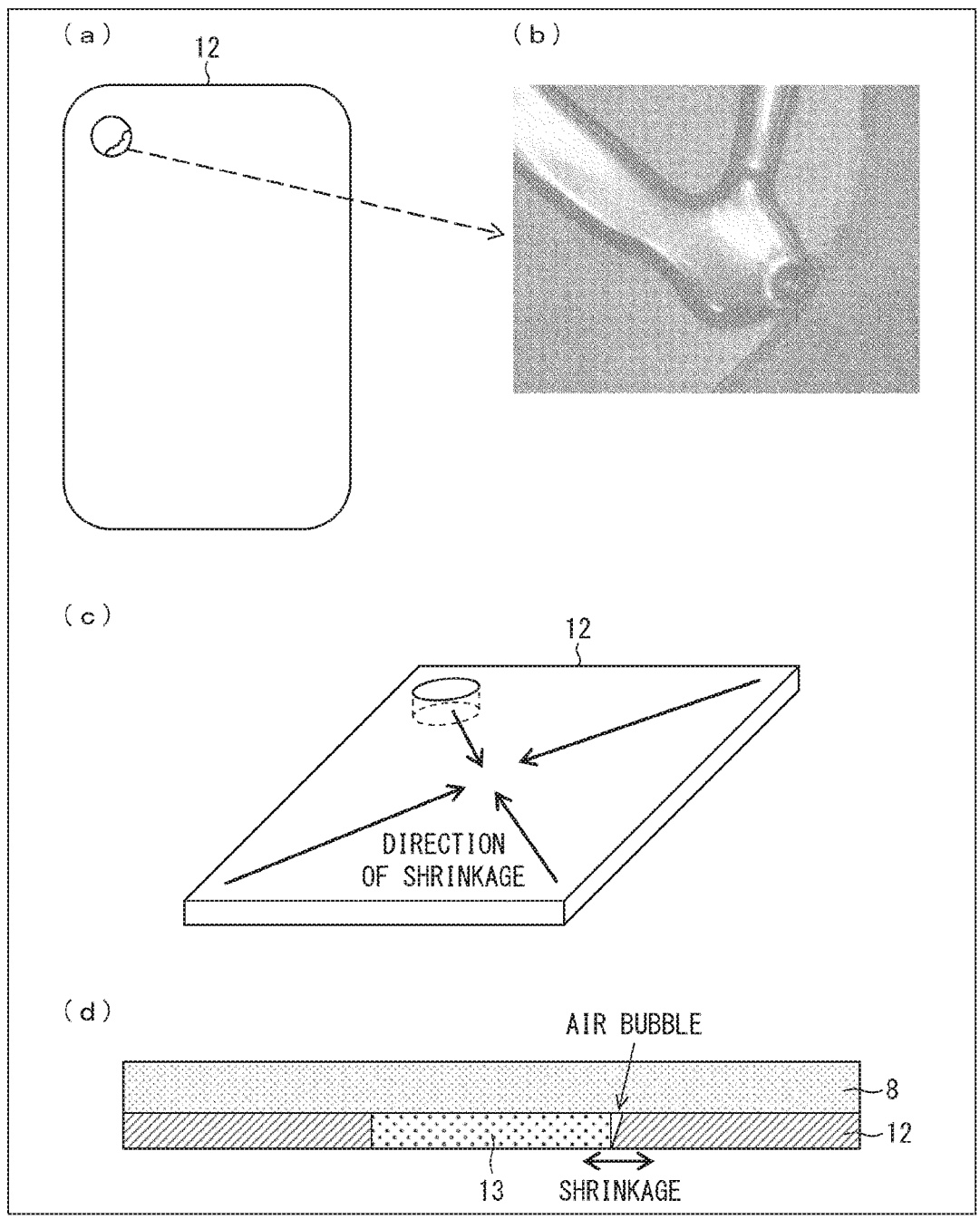
FIG. 9 is a view illustrating generation of an air bubble.

FIG. 9 is a view illustrating generation of an air bubble. As illustrated in (a), (b), (c), and (d) of FIG. 9, in a case where (i) a hole 14 formed in a second polarizer 12 is filled with the liquid transparent resin 13 and (ii) the second polarizer 12 expands or shrinks due to an environmental situation, part of the liquid transparent resin 13 which part is a boundary with the hole 14 comes off the second polarizer 12. This causes generation of an air bubble.

In view of the above, in order that generation of an air bubble is suppressed, a low-elastic UV curable resin is employed which has, as a physical property of a material of the liquid transparent resin 13, a film elastic modulus of, for example, $1.0 \times 10^5$ or less.

According to Embodiment 6, use of a low-elastic resin allows the liquid transparent resin 13 to follow shrinkage of the second polarizer 12. It is therefore possible to prevent the liquid transparent resin 13 from coming off the second polarizer 12, and possible to suppress generation of an air bubble.

Embodiment 7

The following description will discuss Embodiment 7 of the present invention. Note that, for convenience, an identical reference numeral will be given to a member having a function identical to that of a member described in the foregoing embodiments, and description of the member will be omitted. Note also that Embodiment 7 can be applied to Embodiments 1 through 6, 8, and 9.

A display device 2 in accordance with Embodiment 7 further includes an adhesive layer 8 which is provided between a protection plate 9 and a second polarizer 12. A refractive index of a liquid transparent resin 13 is equal to a refractive index of the adhesive layer 8.

Figure 10:
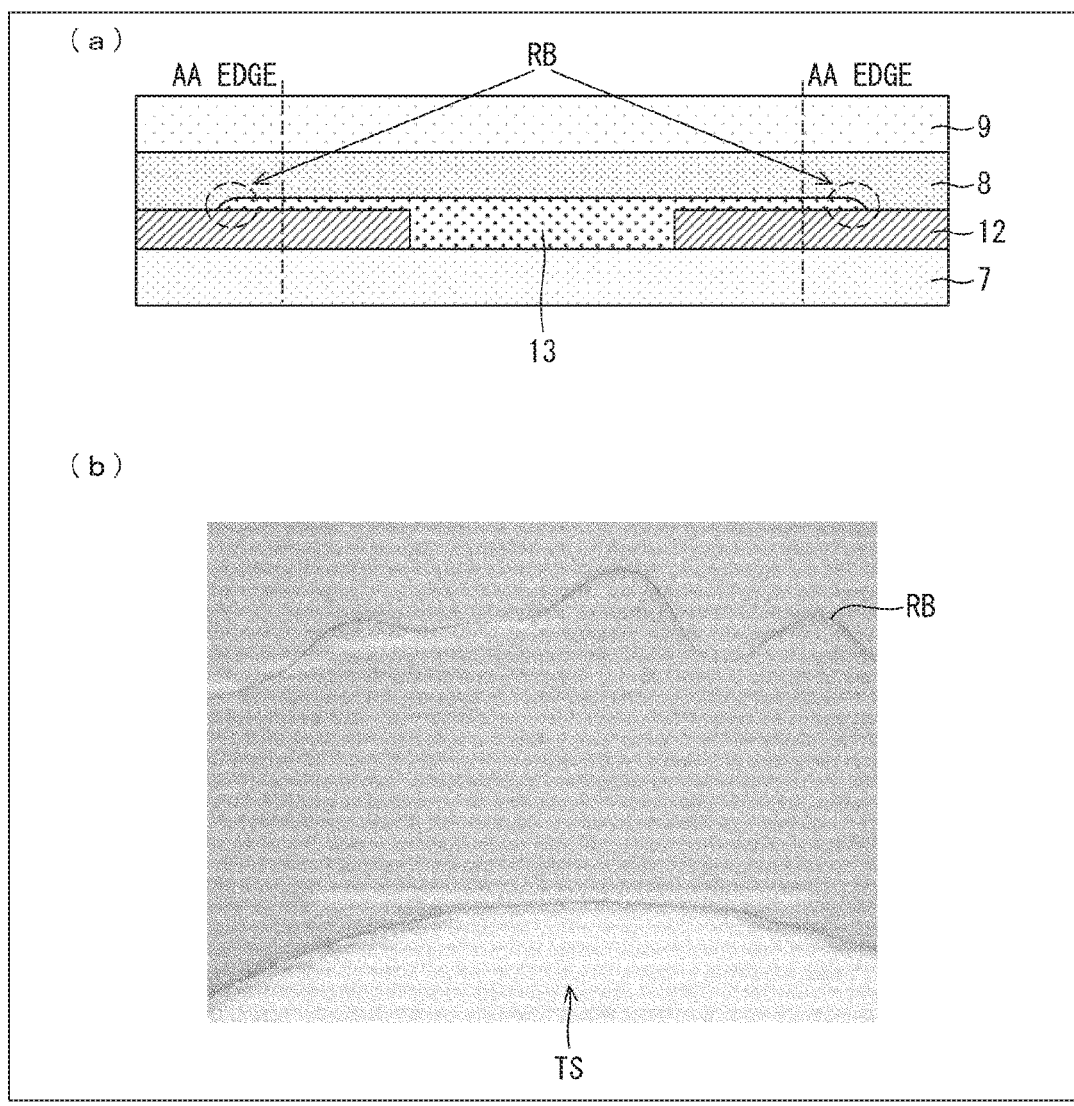
FIG. 10 is a view illustrating a resin boundary part.

FIG. 10 is a view illustrating a resin boundary part RB. It is known that, in a case where a hole 14 is filled with the liquid transparent resin 13 by a second process (process of attaching the protection plate 9 to the second polarizer 12 in a state where the liquid transparent resin 13 is not cured) described in Embodiment 3, there is a risk that the resin boundary part RB is visually recognized as illustrated in (a) and (b) of FIG. 10. This is caused by a difference between a refractive index of the liquid transparent resin 13 and a refractive index (approximately 1.5) of the adhesive layer 8.

In view of the above, according to the display device 2 in accordance with Embodiment 7, a material (typical highly transparent resin having a refractive index of approximately 1.5) of the liquid transparent resin 13 is selected so that the refractive index of the liquid transparent resin 13 is equal to the refractive index of the adhesive layer 8.

This causes the refractive index of the liquid transparent resin 13 to be equal to the refractive index of the adhesive layer 8. Therefore, the resin boundary part RB becomes difficult to visually recognize. Furthermore, it is possible to suppress a problem caused by loss of a transmittance, unexpected refraction of light, or the like.

Embodiment 8

The following description will discuss Embodiment 8 of the present invention. Note that, for convenience, an identical reference numeral will be given to a member having a function identical to that of a member described in Embodiment 1, and description of the member will be omitted.

A display device 2a in accordance with Embodiment 8 is a display device having a see-through panel structure, including: a display panel DP; a protection plate 9 provided on a front side of the display panel DP; an imaging element FD provided on a back side of the display panel DP; a second polarizer (polarizer) 12 provided between the display panel DP and the protection plate 9; and a liquid transparent resin (transparent material) 13a, 13b with which a cutout 15 provided in the second polarizer 12 is filled.

Figure 11:
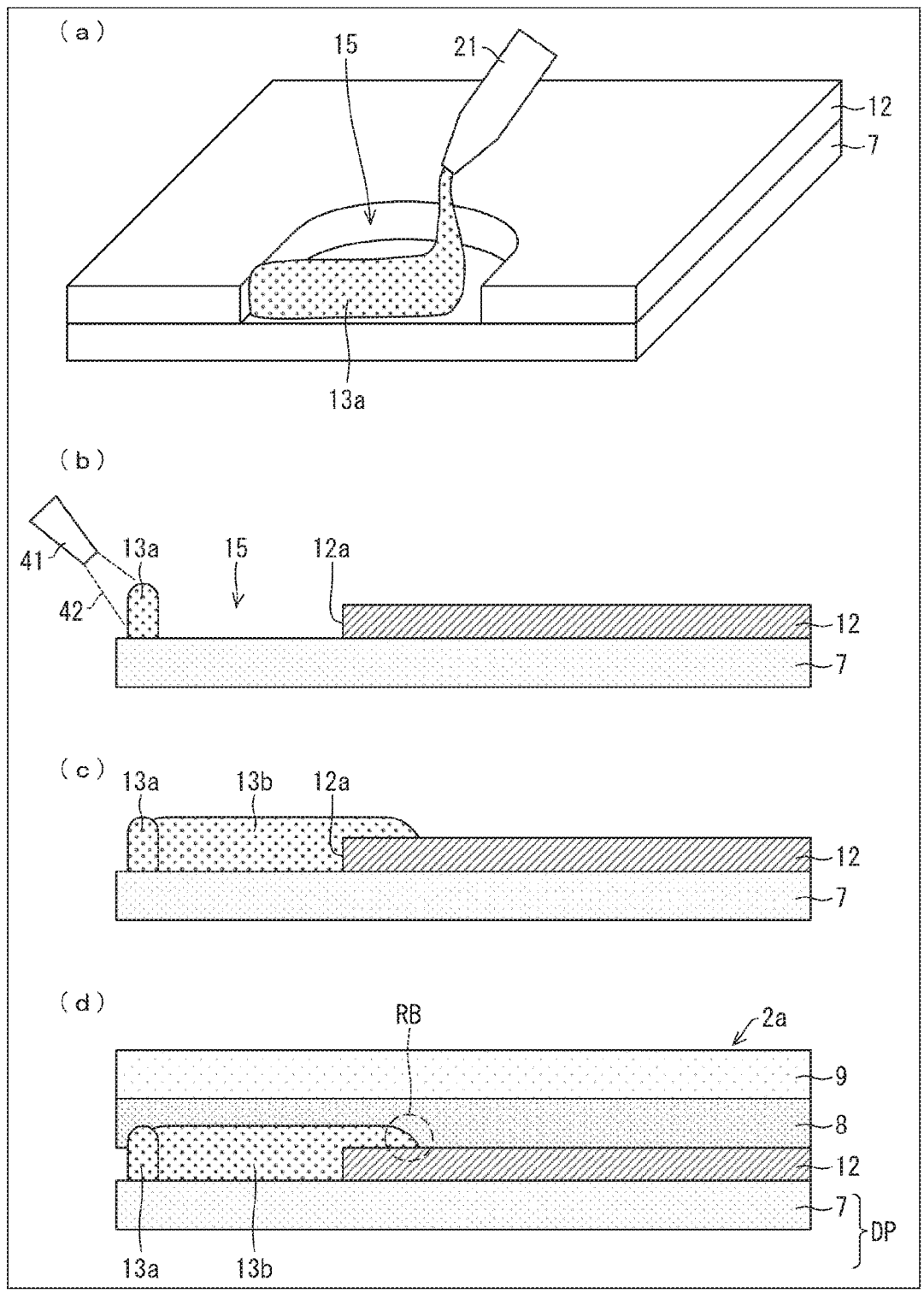
FIG. 11 is a view illustrating a state where a cutout formed in a second polarizer is filled with a liquid transparent resin in accordance with Embodiment 8 of the present invention.

FIG. 11 is a view illustrating a state where the cutout 15 formed in the second polarizer 12 is filled with the liquid transparent resin 13a, 13b in accordance with Embodiment 8.

The liquid transparent resin 13a, 13b is a UV curable liquid transparent resin. The following description will discuss a procedure for filling the cutout 15, formed in the second polarizer 12, with the liquid transparent resin 13a, 13b so that the liquid transparent resin 13a, 13b does not flow out from the cutout 15.

First, as illustrated in (a) of FIG. 11, with use of a predetermined amount of liquid discharging device 21, the liquid transparent resin 13a is laid along part of the cutout 15 which part extends along an outer periphery of the display device 2a.

Next, as illustrated in (b) of FIG. 11, the liquid transparent resin 13a is irradiated with UV 42, emitted from a UV light 41, so that the liquid transparent resin 13a is cured and forms a resin wall.

Then, as illustrated in (c) of FIG. 11, the liquid transparent resin 13b is further injected into part of the cutout 15 which part is surrounded by an inner surface 12a of the second polarizer 12 and the liquid transparent resin 13a which has become a resin wall.

Thereafter, as illustrated in (d) of FIG. 11, the protection plate 9 is attached to a surface of the second polarizer 12 and a surface of the liquid transparent resin 13a, 13b via an adhesive layer 8.

Effect of Embodiment 8

According to Embodiment 8, even in a case where the second polarizer 12 is cut so as to have the cutout 15, it is possible to fill the cutout 15 with the liquid transparent resin 13a, 13b without causing the liquid transparent resin 13a, 13b to flow out from the cutout 15.

Note that a material of the liquid transparent resin 13a, 13b can be selected so that a refractive index of the liquid transparent resin 13a, 13b is equal to a refractive index of the adhesive layer 8. This makes it difficult to visually recognize a resin boundary part RB.

Embodiment 9

The following description will discuss Embodiment 9 of the present invention. Note that, for convenience, an identical reference numeral will be given to a member having a function identical to that of a member described in the foregoing embodiments, and description of the member will be omitted. Note also that Embodiment 9 can be applied to Embodiments 1 through 8.

According to a display device 2 in accordance with Embodiment 9, a liquid transparent resin 13 has a UV blocking function.

Figure 12:
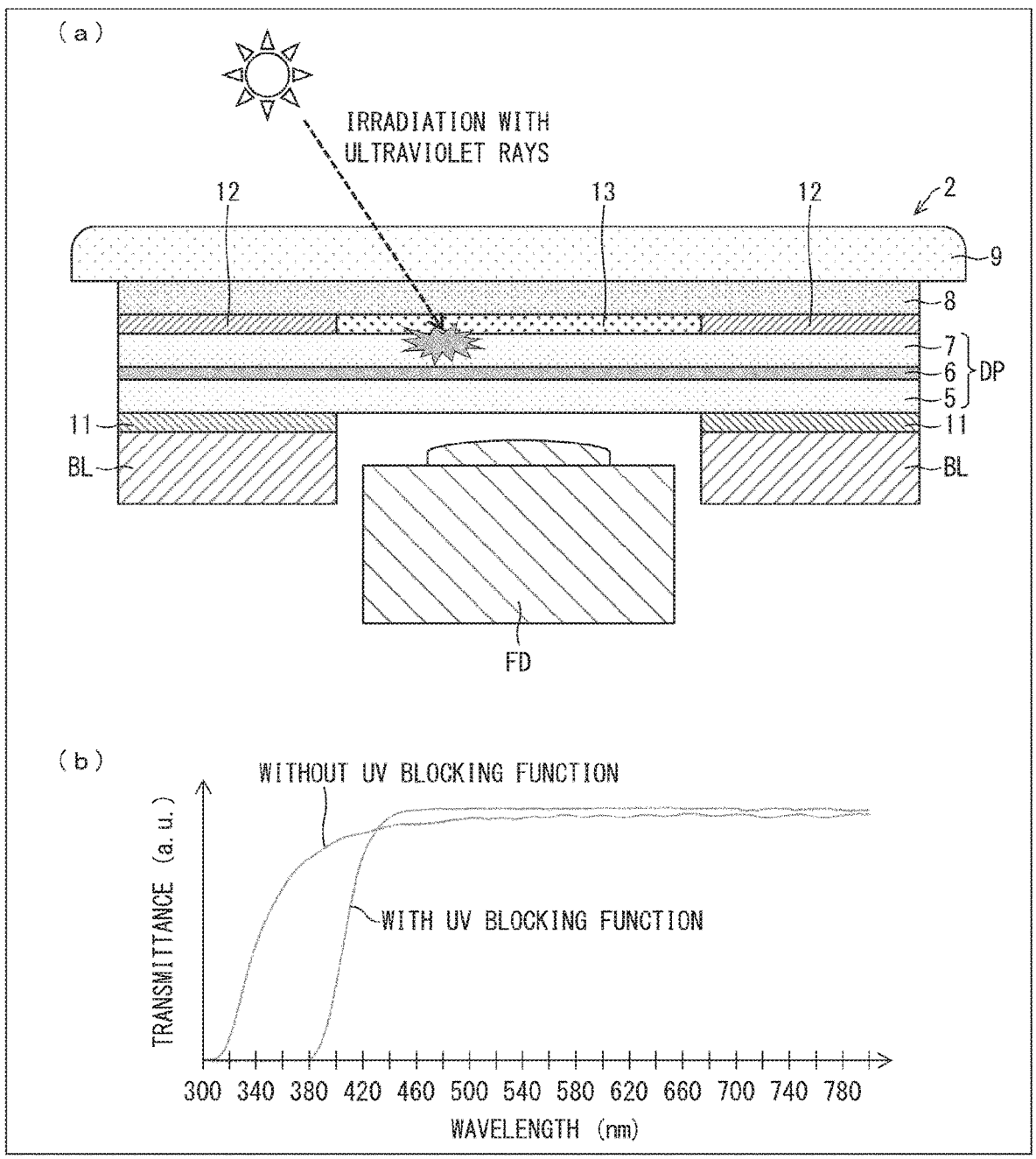
FIG. 12 is a view illustrating a UV blocking function in accordance with Embodiment 9 of the present invention.

FIG. 12 is a view illustrating a UV blocking function in accordance with Embodiment 9.

According to the display device 2 having a see-through panel structure, a second polarizer 12 is cut so as to have a hole, and a protection plate 9 is colorless and transparent. Therefore, there is a problem that ultraviolet rays directly enter a liquid crystal layer 6. Furthermore, it is known that a transmittance of a light transmitting part TS is further increased by a structure in which PI (polyimide) is reduced in a second substrate 7. In a case where the structure in which PI is reduced in the second substrate 7 is employed, a trade-off for employment of such a structure is a further increase in proportion of light, in an ultraviolet region, entering the liquid crystal layer 6. As such, since light having a wavelength in an ultraviolet region enters the liquid crystal layer 6, it is necessary to create a structure for blocking ultraviolet rays.

In view of the above, according to the display device 2, a liquid transparent filling resin 13 is caused to have a UV blocking function.

This makes it possible to prevent UV from entering the liquid crystal layer 6. The liquid transparent resin 13 having the UV blocking function makes it possible to block light in an ultraviolet region of not more than 380 nm, as shown in a graph of wavelength dependency of transmittance illustrated in (b) of FIG. 12.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

[Aspect 1]

A display device having a see-through panel structure, including: a display panel; a protection plate provided on a front side of the display panel; an imaging element provided on a back side of the display panel; a polarizer provided between the display panel and the protection plate; and a transparent material with which a hole passing through the polarizer is filled.

[Aspect 2]

The display device as set forth in, for example, Aspect 1, wherein the transparent material is a low-elastic UV curable resin.

[Aspect 3]

The display device as set forth in, for example, Aspect 1 or 2, further including an adhesive layer provided between the protection plate and the polarizer, a refractive index of the transparent material being equal to a refractive index of the adhesive layer.

[Aspect 4]

The display device as set forth in, for example, any one of Aspects 1 through 3, wherein the transparent material has a UV blocking function.

[Aspect 5]

The display device as set forth in, for example, any one of Aspects 1 through 4, wherein the protection plate is attached to the polarizer after the transparent material injected into the hole is cured.

[Aspect 6]

The display device as set forth in, for example, any one of Aspects 1 through 4, wherein the protection plate is attached to the polarizer before the transparent material injected into the hole is cured.

[Aspect 7]

The display device as set forth in, for example, Aspect 1, wherein the transparent material is a liquid transparent resin which is spread by attaching the protection plate to the polarizer after the liquid transparent resin is applied to a surface of the polarizer.

[Aspect 8]

A display device having a see-through panel structure, including: a display panel; a protection plate provided on a front side of the display panel; an imaging element provided on a back side of the display panel; a polarizer provided between the display panel and the protection plate; and a transparent material with which a cutout formed in the polarizer is filled.

[Aspect 9]

The display device as set forth in, for example, Aspect 8, wherein: the transparent material is a UV curable liquid transparent resin; (1) the transparent material is laid along part of the cutout which part extends along an outer periphery of the display device; (2) the transparent material is irradiated with an ultraviolet ray so that the transparent material is cured and forms a resin wall; and (3) the transparent material is further injected into part of the cutout which part is surrounded by an inner surface of the polarizer and the resin wall.

[Aspect 10]

The display device as set forth in, for example, Aspect 1, wherein the transparent material is a liquid transparent resin injected into the hole.

[Aspect 11]

The display device as set forth in, for example, Aspect 10, wherein, after the transparent material is injected into the hole, part of the transparent material which part exceeds a height of the polarizer is scraped.

REFERENCE SIGNS LIST

2 Display device
8 Adhesive layer
9 Protection plate
12 Second polarizer (polarizer)
13, 13a, 13b Liquid transparent resin (transparent material)
14 Hole 15 Cutout
DP Display panel
FD Imaging element

The invention claimed is:

1. A display device including a see-through panel structure, the display device comprising:
a display panel;
a protection plate provided on a front side of the display panel;
an imaging element provided on a back side of the display panel;
a polarizer provided between the display panel and the protection plate;
a transparent material with which a cutout defined in the polarizer is filled; and
an adhesive layer provided between the protection plate and the polarizer, wherein
the transparent material is a UV curable liquid transparent resin;
a first transparent material of the transparent material is laid along a portion of the cutout that extends along an outer periphery of the display device;
the first transparent material is a resin wall defined by being irradiated with an ultraviolet ray to be cured; and
a second transparent material of the transparent material is a member defined by being injected into a portion of the cutout that is surrounded by an inner surface of the polarizer and the resin wall.

* * * * *